May 28, 1940. H. R. CRAGO 2,202,731
AUTOMATIC TEMPERATURE CONTROL
Filed June 16, 1936
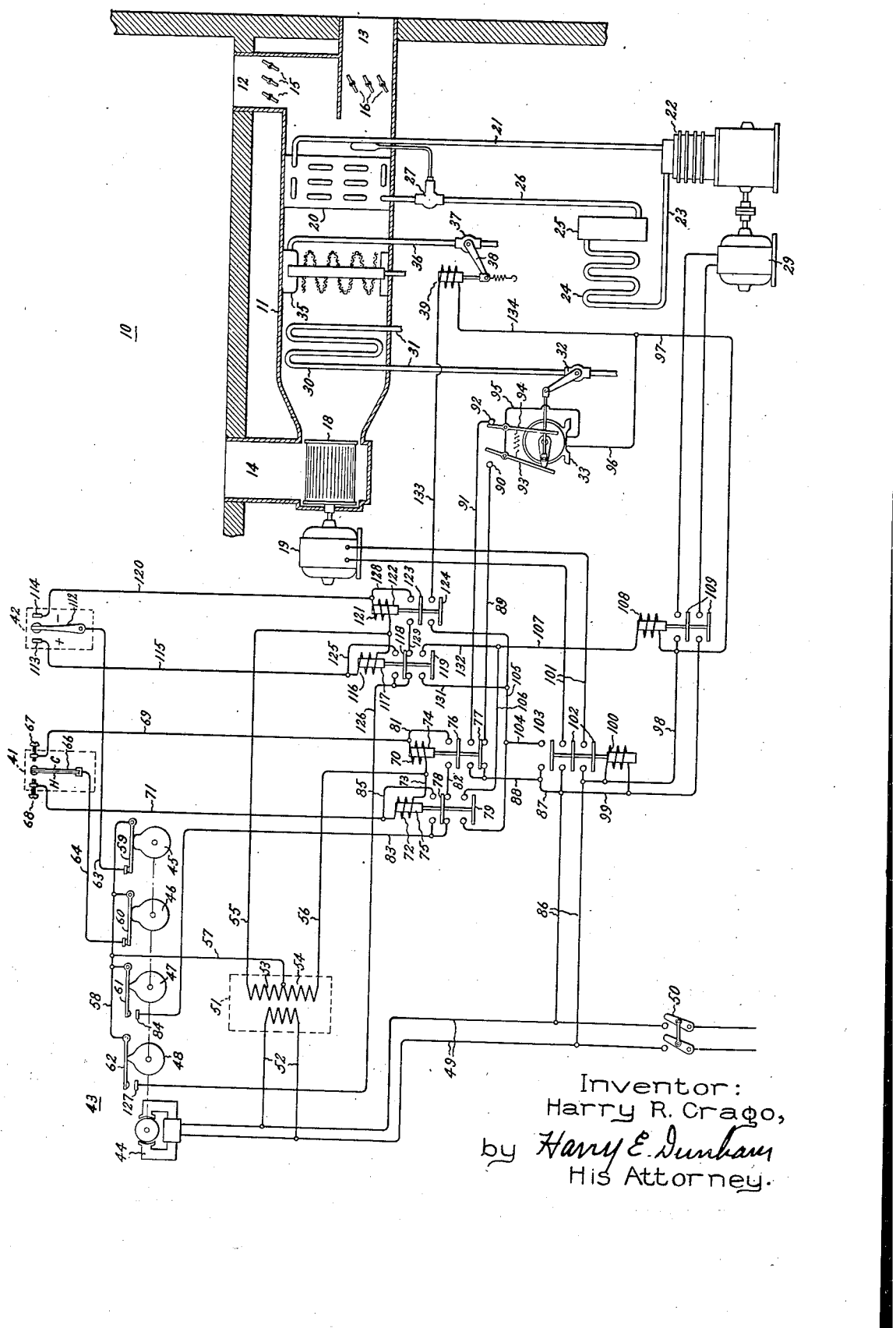
Inventor:
Harry R. Crago,
by Harry E. Dunham
His Attorney.

Patented May 28, 1940

2,202,731

UNITED STATES PATENT OFFICE 2,202,731

AUTOMATIC TEMPERATURE CONTROL

Harry R. Crago, Caldwell, N. J., assignor to General Electric Company, a corporation of New York Application June 16, 1936, Serial No. 85,524

12 Claims. (Cl. 257—3)

My invention relates to a new and improved automatic condition changing control system and more particularly to a control system of the type in which the condition responsive means of the system are cooperatively associated with periodic time controlled means operating independently of day time or night time.

One of the objects of my invention is to provide a time controlled means for periodically rendering a condition responsive means effective for selectively initiating or terminating operation of a condition changing means only at recurring short periods independent of day time or night time.

A primary object of my invention is to provide an improved control arrangement in which a single condition responsive means is adapted to select for operation the proper condition changing means whenever the condition is without predetermined limits and time controlled means of the above character cooperatively associated therewith is adapted to terminate operation of the selected condition changing means only after the condition is returned within said limits.

More specifically, it is an object of my invention to provide a control system for condition changing apparatus, such as heating and cooling or humidifying and dehumidifying means, whereby a single condition responsive means may select and initiate operation of the proper means to maintain the condition within desired limits and time controlled means thereafter may insure operation of the selected means for at least one of a plurality of recurring short periods independent of day time or night time.

It is a further object of my invention to provide the usual means for heating and cooling and means for humidifying and dehumidifying the air with a new and improved control consisting of thermal responsive and time controlled means of the above character for selectively controlling the heating and cooling means and relative humidity responsive and time controlled means of the above character for controlling the humidifying and dehumidifying means.

It is a further object of my invention to provide an arrangement in which humidification or dehumidification may be carried on simultaneously with heating. When the cooling means is in operation humidification may be obtained simultaneously therewith but since the cooling means is also, in accordance with usual practice, the dehumidifying means, dehumidification and cooling will result simultaneously simply from operation of the cooling means.

Another object of my invention is to provide a control in which each condition responsive means requires but a single time controlled means to carry out the desired functions.

A further object of my invention is so to correlate the condition responsive means, time controlled means and the means controlling operation of the condition changing means that the time controlled means periodically renders effective the thermal responsive means and the relative humidity responsive means to exert their selecting function and thereafter maintains the selected apparatus operative until a predetermined time after the thermal responsive means move out of its selective position. In this manner I provide a "cycling" control in which the condition responsive means periodically "feels" the conditions obtaining within the space being conditioned only at recurring short periods independent of day time or night time.

A more specific object of my invention is to provide a novel control in which the pairs of oppositely acting condition changing means are controlled by relays interlocked in such manner that the same thermal responsive and time controlled means may provide "cycling" control of both of said condition changing means.

These and other objects of my invention will become apparent from the ensuing description taken in conjunction with the accompanying drawing in which is set forth for the purpose of illustration the details of the arrangement.

The single figure of the drawing shows diagrammatically air conditioning apparatus designed for year around operation and illustrates schematically a control system therefor embodying the principles and features of the invention.

Referring to the single figure of the drawing, reference numeral 10 designates a space such as a room, building or the like to which conditioned medium such as air is to be supplied. The air is supplied to the space by an air conditioner 11 preferably located without said space and provided with the usual recirculated air duct 12, fresh air duct 13, and a discharge duct 14 leading to the space. The proportions of recirculated and fresh air may be controlled by dampers 15 and 16 in the recirculated and fresh air ducts respectively, controlled either manually or automatically in response to indoor or outdoor temperature variations as desired (control not shown). The conditioner is provided also with a fan 18 positioned in the discharge duct and driven by suitable motive means such as an electric motor 19 that is adapted to be continuously energized whenever the air conditioning system is placed into operation, as will appear more fully hereinafter.

The air drawn through the conditioner by the fan may be suitably conditioned by heating, cooling and humidifying means forming part of the conditioner and the arrangement is such that either the heating or cooling means may be selectively energized by thermal responsive means within the space 10 and the humidifying means and the cooling means may be selectively energized by humidity responsive means within the same space. The cooling means is used not only to cool the air but also to dehumidify it when the humidity within the space is above predetermined limits.

The cooling means consists of the usual mechanical refrigerating apparatus of which the evaporator 20 is connected by a refrigerant line 21 to the suction side of a compressor 22. The high pressure side of the compressor is connected by a conduit 23 to a condenser 24 illustrated as being of the air cooled type but which may be cooled in any desirable manner. The condenser is connected to a liquid receiver 25 leading through conduit 26 to a thermostatically controlled expansion valve 27 controlling the flow of refrigerant to the evaporator. The compressor is driven by a suitable prime mover such as an electric motor 29 under the control of both the thermal responsive means and the humidity responsive means within the space 10.

The heating means of the conditioner is diagrammatically illustrated as a coil 30 adapted to be supplied with a suitable heating medium such as steam or hot water through a pair of conduits 31 connected to a suitable source. The flow of heating medium to the heating coil within the conditioner is controlled by a motor operated valve 32 in the inlet conduit. The motor 33 controlling the operation of the valve is of a well known type adapted to rotate 180° to operate the valve 32 to its closed or open position each time that it is energized under the control of the thermal responsive means within the space. It should be obvious to those skilled in the art that the source of heating medium may be of any of the well known types that are available and that, instead of controlling the position of a valve, I may equally well control the energization of means controlling the position of a damper or control the energization of a burner motor associated with an oil furnace.

The humidifier 35 of the conditioner is of a well-known wire screen construction provided with a water inlet pipe 36, the supply of water through which is controlled by valve 37 having a spring biased operating arm 38 adapted to be moved from a closed to open position by any suitable operating means such as the electrical solenoid 39 illustrated in the figure.

My invention is not directed to the particular means described above for performing any of the condition changing functions but it is directed to the control to be described hereinafter.

Briefly, the control consists of thermal and humidity responsive devices adapted selectively to engage a pair of contacts associated with each to initiate operation of either the heating or cooling means and the humidifying or dehumidifying means, respectively. Time controlled means are provided for each of the condition responsive means for periodically rendering them effective to energize electrical means controlling the operation of the various condition changing means. Upon energization, the electrical means are adapted to be locked in their energized positions by holding circuits comprising other synchronized time controlled means. The synchronized time controlled means are so arranged that the energizing circuit is maintained for only a brief period while the holding circuit is maintained closed during that period of each cycle that the energizing circuit is opened. In this manner, the condition responsive means is used only periodically to feel the condition obtaining within the space. If the condition is without predetermined limits the apparatus selected for operation by the condition responsive means will be maintained in operation until normal conditions again obtain within the space.

According to my invention I provide a pair of condition responsive means 41 and 42 responsive to temperature and humidity changes, respectively, having associated therewith time controlled means 43 consisting of the usual electrical clock motor 44 and a series of cams 45 to 48, inclusive. The clock motor is adapted to be energized continuously through a source of supply 49 whenever a manually operated switch 50 is moved to its closed position and the control itself is supplied with low voltage energy through a transformer 51 having its primary winding connected to the supply conductors 49 through conductors 52. The secondary winding of the transformer is divided preferably, but not necessarily, into two portions 53 and 54 adapted to supply energy to the thermal and humidity responsive controls through conductors 55 and 56 and a midpoint conductor 57. The latter is connected by a conductor 58 to a plurality of cam follower arms 59 to 62, inclusive, associated with each of the cams 45 to 48, inclusive. Cams 45 to 46, similarly constructed, constitute time controlled means adapted intermittently to render the condition responsive means effective to energize the various electrical control means controlling the operation of the various condition changing means. Cams 47 and 48, likewise similarly constructed, are adapted, on the other hand, to periodically energize the holding circuits for the electrical control means, as will appear more fully hereinafter. It may be noted that the synchronized pairs of cams 46, 47 and 45, 48 are of somewhat different construction the cams 45 and 46 being adapted to close their normally open energizing circuits for brief intervals overlapping the interval that the cams 47 and 48 momentarily break their associated normally closed enengization maintaining circuits.

Conductors 63 and 64 connect contacts associated with cam follower arms 59 and 60 to the humidity responsive and thermal responsive means 42 and 41, respectively. The thermal responsive means 41 consists of a thermal responsive element 66, illustrated as a bimetallic element, having associated therewith a pair of adjustably mounted contacts 67 and 68. The former, engageable by element 66 when the temperature decreases below a predetermined value, is connected by a conductor 69 to electrical means, such as a relay 70, controlling the operation of the heating means. Adjustably mounted contact 68, engageable by the thermal responsive element when the temperature within space 10 exceeds a predetermined upper limit, is connected through a conductor 71 to a relay 72 controlling the operation of the cooling means. Conductor 56 leading from portion 54 of the secondary winding of the transformer is connected to a conductor 73 connecting the relays 70 and 72.

The relays 70 and 72 have associated therewith armatures 74 and 75, respectively, and each armature has associated therewith a pair of switches 76, 77 and 78, 79, respectively. Switches 76 and 78 form interlocks controlling holding circuits for the respective relays and switches 77 and 79 control the heating and cooling apparatus, respectively. The holding circuit for relay 70 extends from conductor 69 through a conductor 81, a pair of normally open contacts associated with interlock 76, conductor 82, interlock 78 normally in engagement with a pair of contacts and a conductor 83 leading to a contact 84 associated with cams 47. The holding circuit for relay 72 extends from conductor 71 through a conductor 85, a pair of normally open contacts associated with interlock 78 and thence through conductor 83 through the above mentioned contact 84.

The valve motor controlling the supply of heating medium is supplied with energy from the supply conductors 49 through a pair of conductors 86 from one of which conductors 87 and 88 to each of a pair of contacts associated with the switch 77 of the heating control. The normally closed contact of switch 77 is connected by a conductor 89 to a limit contact 90 associated with valve motor 33 and the normally open contact is likewise connected by a conductor 91 to a second limit contact 92. The limit contacts have associated therewith a pair of motor operated limit switches 93 and 94 indicated in the positions they assume with the valve fully closed. When the valve is in its opposite position, i. e. fully open, the limit switch 94 is disengaged from its associated contact 92 and limit switch 93 engages its associated contact 90. The limit switches are connected to one terminal of the operating winding of the motor by a conductor 95 and the other terminal of the motor winding is connected to conductors 96, 97, and 98 leading to one of the supply conductors 86.

The cooling means is energized through an interlock on the fan control relay preventing the operation of the former unless the fan motor 19 is energized. Conductors 98 and 99 connect the fan control relay 100 directly to the source of power through branch supply conductors 86 whenever switch 50 is closed. The energization of relay 100 effects upward movement of its associated armature thereby energizing the fan motor 19 through a pair of conductors 101 and a pair of switches 102. The normally open fan control relay interlock 103 thereby connects one of the supply conductors to a conductor 104 leading to one of a pair of conductors 105 and 106 adapted to be connected by the switch 79 whenever the relay 72 is energized. Conductor 106 is connected by a conductor 107 to a relay 108 controlling the operation of the compressor motor 29 through a pair of switches 109 adapted to connect the compressor motor to branch supply conductors 98 and 99 whenever the relay is energized.

The control circuits through which the humidification and dehumidification may be obtained through operation of the humidity responsive means will now be described in detail. The humidity responsive means 42 consists of an element 112 moved in response to relative humidity conditions within the space 10. Associated therewith is a pair of contacts 113 and 114, the former of which is connected through conductor 115 to a cooling (or dehumidifying) control relay 116 having associated therewith an armature 117 and a pair of switches 118 and 119. The contact 114 is connected in similar manner by a conductor 120 to a humidifying control relay 121 having associated therewith an armature 122 and a pair of switches 123 and 124. Switches 118 and 123 are interlocks corresponding to interlocks 76 and 78 of the previously described relay mechanisms and constitute the means for locking the relays whenever the latter are energized. The holding circuit for relay 116 extends from conductor 115 through a conductor 125, the normally open contacts associated with interlock 118 and a conductor 126 leading to a contact 127 associated with cam 48. The holding circuit for relay 121 extends from conductor 120 through conductor 128, the normally open contacts associated with interlock 123, conductor 129, the normally closed contacts associated with interlock 118 and conductor 126 leading to the aforementioned contact 127. Switch 119 associated with the cooling control relay 116 is connected by a pair of conductors 131 and 132 to the conductors 105 and 106 whereby switches 79 and 119 are connected in parallel in such manner that closure by either of their respective contacts will energize the relay 108 controlling operation of the compressor motor. Switch 124 controls the energization of the humidifying means and one of the normally open contacts associated therewith is connected to conductor 105 while the other is connected by a conductor 133 to the solenoid 39 controlling valve 37. The solenoid 39 has its other terminal connected to previously mentioned conductor 97 through a conductor 134.

To initiate operation of the system switch 50 is operated manually to its closed position thereby connecting the supply conductors 49 and the various branch supply conductors 52—86, 98—99 to the source of supply. Upon closure of said switch, relay 100 controlling the operation of the fan motor is energized through an obvious circuit and its associated switches 102 connect the fan motor to the branch supply conductors 86 through conductors 101. Interlock 103 associated with the relay also connects conductor 87 to the conductor 104 thereby enabling the cooling apparatus to be operated under the control of the condition responsive means.

The operation of the system as it functions in response to variations in temperature within the zone 10 will first be given. Upon closure of switch 50 the time controlled means 44 is energized and the cams associated therewith are rotated at a constant speed, preferably one revolution per minute. With the thermal responsive means in a position intermediate its associated contacts none of the relays will be energized.

Assuming first that the temperature decreases below a predetermined value, then thermal responsive element 66 will engage its associated contact 67, thereby energizing heat control relay 70 the first time that cam 46 which periodically renders the thermal responsive element 66 effective to initiate heating operation only at recurring short periods closes the circuit connecting conductors 58 and 64. The energizing circuit for the relay is as follows: from the midpoint of the secondary winding of the transformer through conductor 57, conductor 58, cam follower arm 60 in engagement with its associated contact, conductor 64, thermal responsive element 66 in engagement with contact 67, conductor 69, the relay winding 70 and conductor 56 back to one terminal of the transformer winding 54.

Energization of relay 70 results in the establishment of a holding circuit therefor and the opening of the valve 32 admitting heating medium to the heating coil 30.

The holding circuit for the relay is established through cam 47 which periodically renders the thermal responsive element 66 effective to terminate heating operation only at recurring short periods and closes its contacts sometime prior to the opening of contacts associated with cam 46. The holding circuit is as follows: from the midpoint of the secondary winding of the transformer through conductor 57, conductor 58, cam follower arm 61 in engagement with contact 84, conductor 83, interlock 78 in its normally closed position, conductor 82, interlock 76 in engagement with its associated normally open contacts, conductor 81 to the relay winding and thence through conductor 56 to the other terminal of the transformer secondary winding 54.

The energizing circuit for the valve operating motor 33 extends from one of the pair of branch supply conductors 86 through conductors 87 and 88, switch 77 in engagement with its associated normally open contacts, conductor 91, limit switch 94 in engagement with contact 92, conductor 95 to the motor winding and from thence through conductors 96, 97, and 98 to the other of the pair of branch supply conductors 86. Motor 33 is thereby energized to open valve 32 upon rotation of 180° and moves limit switch 94 out of engagement with contact 92 and limit switch 93 into engagement with contact 90, thereby conditioning the motor circuit for subsequent energization to operate the valve to its closed position when switch 77 moves into engagement with its lowermost contacts.

Heating medium will be supplied to the heating coil 30 until the thermal responsive element 66 moves out of engagement with contact 67 and the above described holding circuit is opened by operation of cam 47. It will be obvious from the above description that as long as the thermal responsive element remains in engagement with contact 67 each time that the holding circuit is broken by cam 47 the relay 70 is maintained energized through the initial energizing circuit and each time that the energizing circuit is broken by cam 46 the holding circuit maintains it energized. In this way the thermal responsive element 66 is periodically rendered effective for selectively initiating or terminating the heating operation only at recurring short periods. However, upon disengagement of the thermal responsive element from the contact the initial energizing circuit is broken and the subsequent opening of the holding circuit by cam 47 results in the deenergization of relay 70. The holding circuit is broken by downward movement of interlock 76 and the motor 33 is energized to close valve 32 by the return of switch 77 to its original position. The energizing circuit for the motor extends through conductors 87 and 88, switch 77 in engagement with its normally closed contacts, conductor 89, contact 90, limit switch 93 in engagement therewith, conductor 95 to the motor winding and from thence through conductors 96, 97 and 98 to the other branch supply conductor 86. Energization of the motor results in closure of valve 32 and the return of the limit switches to the position indicated.

Assuming now that the temperature within the space increases above a predetermined limit, then thermal responsive element 66 engages its associated contact 68. The result is the energization of the cooling control relay 72 the first time that cam 46 closes a circuit connecting conductors 58 and 64. The energizing circuit for relay 72 is as follows: from the midpoint of the secondary winding of the transformers through conductors 57 and 58, cam follower arm 60 in engagement with its associated contact, conductor 64, thermal responsive element 66 in engagement with contact 68, conductor 71 and the relay winding 72 and from thence through conductors 73 and 56 to the terminal of the transformer winding 54. Energization of the relay winding results in upward movement of interlock 78 and switch 79 into engagement with their respective normally open contacts. The former energizes a holding circuit for relay 72 through conductors 85 and 83 and cam 47 and the latter energizes the cooling control relay 108 controlling operation of the compressor motor. The energizing circuit for relay 108 extends from one of the pair of branch supply conductors, through conductor 87, interlock 103 in engagement with its associated contacts, conductor 104, conductor 105, switch 79 in engagement with its normally open contacts, conductors 106 and 107 to the relay winding 108 and from thence through conductor 98 to the other of the branch supply conductors 86. Energization of the relay effects upward movement of its associated armature and the connection of the compressor motor to the source of supply by switches 109. The compressor motor is thereby energized to cool the air passing through the conditioner and it will remain energized until the thermal responsive means moves out of engagement with contact 68. The operation of the time controlled means is the same as that described in connection with the heating means because of the fact that the energizing circuit is controlled by cam 46 and the holding circuit by cam 47. Whenever the temperature decreases below the predetermined upper limit the thermal responsive element moves out of engagement with contact 68 and thereafter cam 47 will interrupt the holding circuit and deenergize relay 72. The latter in turn deenergizes relay 108 through operation of switch 79.

Considering now the operation of the humidifying means it will be seen from the subsequent description that the humidifying means may be operated simultaneously with the heating or cooling means. This operation possesses the advantageous result that humidification may be had during the performance of either of these functions. While it is uncommon that humidification may be desired during those seasons when cooling is required it may be that it is desirable under certain conditions, as in certain manufacturing processes and the like.

Whenever the humidity responsive element 112 moves into engagement with contact 114 indicating the need for raising the humidity within the space, the humidity control relay 121 will be energized. The energizing circuit for this relay is as follows: from the midpoint of the secondary winding of the transformer from conductors 57 and 58, cam follower arm 59 in engagement with its associated contacts, conductor 63, humidity responsive element 112 in engagement with contact 114, conductor 120 and the relay winding 121 and thence through conductor 55 to the other side of the secondary winding 53. Energization of relay 121 results in the closure of a holding circuit for the relay and an energizing circuit for solenoid 39, the latter effecting the opening of valve 37 to admit the flow of water to the humidifier. The holding circuit for the relay is as follows: from the midpoint of the secondary winding through conductors 57 and 58, cam follower arm 62 in engagement with contact 127, conductor 126, interlock 118 in engagement with its normally closed contacts, conductor 129, interlock 123 in engagement with its normally open contacts, conductor 128 leading to the relay winding 121 and from thence through conductor 55 to the tranformer secondary winding section 53. The energizing circuit for the solenoid 39 is as follows: from conductor 87 through the interlock 103 in its closed position, conductors 104 and 105, switch 124 in engagement with its associated contact, conductor 133 leading to the solenoid winding 39, and from thence through conductors 134, 97, and 98 to the other of the branch supply conductors 86. Thereupon the humidifying means is rendered effective to humidify the air supplied to space 10 until such time as the humidity responsive means 112 moves out of engagement with its associated contact. The control of the humidifying means by cams 45 and 48 is exactly the same as that described in connection with the thermal responsive means by cams 46 and 47 and will not be described in any greater detail here. Whenever the humidity has been raised sufficiently cam 48 deenergizes the holding circuit for relay 121 and operation of the humidifying means is terminated.

Whenever the humidity in the space 10 increases above predetermined limits humidity responsive element 112 engages contact 113 thereby establishing an energizing circuit for the dehumidifying or cooling control relay 116. The energizing circuit is as follows: from the midpoint of the secondary winding through conductors 57 and 58, cam follower arm 59 in engagement with its associated contact, conductor 63, humidity responsive element 112 in engagement with contact 113, conductor 115 to the relay winding 116 and thence through conductor 55 to the other terminal of secondary winding section 53. Energization of the relay results in the establishment of a holding circuit through conductor 125, interlock 118, conductor 126, and contacts operated by cam 48 and also in the energization of the relay 108 controlling the energization of the compressor motor. The relay 108 is energized through a circuit extending from one of branch supply conductors 86 through conductors 87, interlock 103, conductors 104 and 105, switch 110, conductors 132 and 107 leading to the relay winding and from thence through conductor 98 to other branch supply conductor 86. The compressor motor is thereby energized and the refrigerating apparatus again cools the air to condense some of the moisture in the air and thereby decreases its humidity.

Whenever the air within the space has been dehumidified to the desired extent the humidity responsive element moves out of engagement with contact 113 and thereafter cam will interrupt the holding circuit for relay 116 in a manner that is obvious from the preceding description.

In case the humidity and temperature both exceed predetermined limits, it will be obvious that both the condition responsive means will merely close parallel energizing circuits for the relay 108 by closure of interlocks 79 and 118. This will not result in any harmful effect for as long as the cooling means is operated the temperature will be reduced and, at the same time the humidity will be reduced.

Under some weather conditions it may be that in order to decrease the humidity to a desired value it may be necessary to reheat the air after it passes by the evaporator 20. It is obvious that in such event the cooling means will be acting in opposition to the heating means. The former will be effective to decrease the humidity while the latter is effective to raise the temperature to a desired value.

What I claim as new and desire to secure by Letters Patent of the United States is:

1. In a system for supplying conditioned medium to a space, the combination including a plurality of condition changing means for conditioning said space, electrical means associated with each of said means for controlling the operation of said means, means including a source of energy, an energizing circuit for each of said electrical means, condition responsive means for selectively closing a portion of said circuit and time controlled means periodically connecting said energizing circuit to said source of energy for selectively initiating operation of said condition changing means and means including said time controlled means and a second circuit periodically energized thereby for maintaining in operation the condition changing means selected for operation by said condition responsive means.

2. In a system for supplying conditioned medium to a space, the combination including a plurality of condition changing means for conditioning said space, electrical means associated with each of said means for controlling the operation of said means, means including a source of energy, an energizing circuit for each of said electrical means, condition responsive means for selectively closing a portion of said circuit and time controlled means for periodically connecting said energizing circuit to said source of energy for selectively initiating operation of said condition changing means, and means including said time controlled means and a second circuit comprising interlocking means operated by said electrical means adapted to be connected to said source of energy by said time controlled means when said first circuit is disconnected therefrom for maintaining in operation the condition changing means selected for operation by said condition responsive means.

3. In a control system the combination including a condition responsive means including a member movable in response to changes in said condition and a pair of contact members selectively engaged by said movable member on predetermined movements of the latter from a predetermined normal position, a relay mechanism comprising a pair of relays each connected to a predetermined one of said contact members, a source of energy and electrical connections whereby said relays are energized by said movable member making contact with a corresponding contact, and means for electrically locking each of said relays when energized, said means including interlocks so connected that one of said relays locks itself in and the other through the interlock controlled by the first.

4. In a control system the combination including a condition responsive means including a member movable in response to changes in said condition and a pair of contact members selectively engaged by said movable member on predetermined movements of the latter from a predetermined normal position, a relay mechanism comprising a pair of relays each connected to a predetermined one of said contact members, a source of energy and electrical connections whereby said relays are energized by said movable member making contact with a corresponding contact, means for electrically locking each of said relays when energized, said means including interlocks so connected that one of said relays locks itself in and the other through the interlock controlled by the first, and periodically operating means for interrupting alternately said energizing and locking circuits.

5. An electrical relay mechanism comprising a pair of relays, each of said relays having a winding and an armature, means including a circuit comprising condition responsive means and a time controlled means for selectively energizing said windings, and means including a second circuit comprising interlocks operated by said armatures and time controlled means for electrically locking said relays when energized, the time controlled means being adapted alternately to deenergize their respective circuits.

6. An electrical relay mechanism comprising a pair of relays, each of said relays having a winding and an armature, means including a circuit comprising condition responsive means and time controlled means for selectively energizing said windings, and means including a second circuit comprising an interlocking means operated by each of said armatures and time controlled means for electrically locking said relays when energized, said interlocking means being so connected that one of said relays is locked by the interlocking means operated by it and the other jointly by both said interlocking means.

7. In a system for supplying conditioned medium to a space, the combination including heating means, cooling means, and humidifying means, electrical relays controlling operation of said heating and humidifying means, a pair of electrical relays controlling said cooling means, thermal responsive means within said space for selectively energizing the relay controlling said heating means and one of said pair of relays controlling said cooling means, and humidity responsive means within said space for selectively energizing the other of said pair of relays controlling said cooling means and the relay controlling said humidifying means.

8. An electrical relay mechanism comprising a relay having a winding and an armature, means including a circuit comprising condition responsive means and a time controlled means periodically rendering said condition responsive means effective only at recurring short periods for energizing said winding, and means including a second circuit comprising interlocks operated by said armature and time controlled means for electrically locking said relay when energized at all times other than a portion of said recurring short periods.

9. In combination, a relay having an energizing circuit and a holding circuit, and control means therefor including a condition responsive switch in said energizing circuit, a timing device having one switch connected in series with said condition responsive switch and closing only at recurring short periods, and a second switch connected in said holding circuit and opening only during a portion of each of said recurring short periods.

10. Condition response control means including a member movable in response to changes in the condition, a pair of condition controlling contacts opened and closed by said movable member upon predetermined movements of said member, an electrically operated condition control device having an energizing circuit including said pair of conditioning control contacts and an energization maintaining circuit including a pair of maintaining contacts closed upon energization of said device, and a continuously operating timing device having two pairs of synchronized timing contacts, one pair being normally open and closed only periodically for short intervals and connected in series with said pair of conditioning controlling contacts in said energizing circuit, and the other pair being normally closed and opened only during a small portion of each of said short intervals and connected in series with said pair of maintaining contacts in said energization maintaining circuit whereby said movable member is rendered effective periodically to cause energization of said condition control device only during said short intervals and to cause deenergization of said device only during said small portion of said short intervals.

11. In combination, in a condition responsive control system, a continuously operating timer having a pair of synchronized timing circuit controlling means, one for closing a circuit periodically for a relatively short interval and the other for opening a circuit momentarily during said interval, a condition responsive circuit controller having a circuit opening position and a circuit closing position, and electromagnetic control device having a switch operated from the circuit opening to the circuit closing position upon energization of said device, an energization circuit for said device having said one timing circuit controlling means and said condition responsive circuit controller connected in series therein and a holding circuit for said device including said switch and said other timing circuit controlling means connected in series therein.

12. Condition responsive selective control means including a member movable in response to changes in the condition, selective circuit closing and opening means operated by said member, a pair of electrically operated condition control devices, each having an energizing circuit selectively controlled by said selective circuit closing and opening means and each having an energization maintaining circuit including a circuit closing means operated upon the selective energization of the corresponding device, and a continuously operating timing device having a pair of synchronized circuit controlling means, one being normally open and closed only periodically for short intervals and connected in series with said selective circuit closing and opening means to control said energizing circuits and the other being normally closed and opened only during a small portion of each of said short intervals and connected in each of said energization maintaining circuits whereby said movable member is rendered effective periodically to cause selective energization of said condition control devices only during said short intervals and to cause deenergization of said devices only during said small portion of said short intervals.

HARRY R. CRAGO.